United States Patent [19]
Senften

[11] 3,782,831
[45] Jan. 1, 1974

[54] ANGULAR POSITION TRANSDUCER APPARATUS

[75] Inventor: David A. Senften, Florissant, Mo.

[73] Assignee: Hunter Engineering Company, Bridgeton, Mo.

[22] Filed: Nov. 5, 1971

[21] Appl. No.: 196,034

[52] U.S. Cl.................. 356/152, 356/155, 356/172, 33/288, 33/337
[51] Int. Cl. ............................................ G01b 11/26
[58] Field of Search ....................... 356/1, 4, 5, 141, 356/152, 158, 155, 172; 250/203 R; 33/288, 337; 350/6; 172/4.5

[56] References Cited
UNITED STATES PATENTS

| | | | |
|---|---|---|---|
| 3,554,646 | 1/1971 | Carlson | 356/4 |
| 3,599,552 | 8/1971 | Harvey | 95/44 C |
| 2,870,671 | 1/1959 | Falconi | 250/203 R |

Primary Examiner—Benjamin A. Borchelt
Assistant Examiner—S. C. Buczinski
Attorney—Frederick M. Woodruff et al.

[57] ABSTRACT

Apparatus for use in measuring any angular relationship between a movable body and a fixed reference axis or point, wherein the measuring is achieved by an angular position transducer. The transducer adapts itself to improved method of measuring angular relationship, particularly where the angles are small, so that small angles can be expanded for easier examination. An example is the determination of vehicle wheel toe angles which are small but important to the proper operation of any vehicle.

7 Claims, 11 Drawing Figures

ANGULAR POSITION TRANSDUCER APPARATUS

BRIEF OUTLINE OF THE INVENTION

This invention relates to angular position transducer apparatus and is particularly concerned with improved apparatus for determining the angular position of a body relative to a reference axis and to a method for determining the angular position of a body or bodies relative to a reference axis.

The present apparatus is useful in determining angular positions of objects relative to a reference axis or plane, or the angular relationship of two objects. One example is the determination of the toe of vehicle steerable wheels, but no limiation is intended from this example as other applications of the apparatus will come to mind after the apparatus and its method of use has been more fully described. However, it is deemed sufficient to set forth the invention in relation to the determination of vehicle wheel toe angles.

This apparatus and its method of use makes use of light beams as a transmission medium so that no physical connection is required between the source of the light beam and the beam sensing means to form a reference for the angular measurements. Furthermore, there is no need for external stationary charts or mirrors, and no requirement arises for preliminary alignment or adjustment to establish a reference plane or axis.

In the case of vehicle steerable wheels, each wheel is provided with a unit which contains both a light beam transmitter and a beam detector. The units are positioned so as to be located on a common reference axis which is parallel to the true axis of rotation of the wheels, thereby placing the units in positions free of wheel interference and in view of each other. Each transmitter projects a narrow beam of light in a direction perpendicular to the plane of the wheel on which it is mounted and along the reference axis toward the opposite unit. Also, each unit contains a light beam detector capable of sensing the incidence of the light beam from the opposite unit. These units are electrically connected to a computer console or similar equipment whereby the detection of the light beams may be translated into a visual display of the angles formed by the wheels relative to the reference axis. Since the reference axis is parallel to the true axis, the visual display provides a direct reading of the angular measurements being investigated.

Through the means of motors and cams in each unit the narrow light beam from each unit is swept repeatedly through an angle which includes all angles expected to be measured. Each light beam in its sweep falls on the light detector of the opposite cooperating unit. As the beams are detected an analog voltage signal, synchronized to the sweep of the beams is developed in each unit so that the voltage signal is proportional to the angle between the beam and the plane of the wheel to which the units are attached. Concurrently during the angular sweep of each beam when the beam strikes the opposite detector, a signal is generated which causes the voltage analog to be sampled. The voltage present at the precise time of detection is captured and fed into a memory circuit. This voltage is translated by suitable meters using resistive ranging and zeroing circuits to display the angles wanted.

The objects of this invention are to provide apparatus which requires no physical connections between the angular measuring elements, to provide apparatus which operates in a position along a reference axis which is parallel to the true axis of a body or bodies to be examined for angular relationship to the true axis, to provide apparatus of electrical and optical nature for directly determining angular measurements, and to provide a method for investigating the angular relationships of bodies.

A preferred embodiment may be an angular position transducer apparatus for determining the angular position of a body relative to a predetermined reference line and wherein the apparatus comprises: a light projector oriented relative to the body so as to normally direct its light beam along the reference line and thereby have a known angular relation with the body, light beam sensing means spaced from the light projector and situated on the reference line, means to swing the projector independently of the body and to either side of its known angular relation to the body, the light beam sensing means generating a signal response on receiving the light beam at the angular deviation thereof from its known angular relation, signal voltage generating means operable concurrently with said light projector swing means to generate a signal voltage proportional to the angular deviation of the light beam from its known angular position, and means connected to the voltage generating means to display the voltage in terms of angular units.

The apparatus of the preferred embodiment is exemplary of a preferred method for finding the angular position of a body relative to a reference axis, and the method thereof includes sweeping a light beam along the reference axis and through an angle which includes the angular relation of the body to the reference axis, generating a voltage which changes in timed relation to the light beam sweep in one direction through its angular sweep, detecting the light beam at the angular position of the body relative to the reference axis, applying the time of light beam detection to finding the amount of the voltage change, and translating the change in voltage at the time of detection into an angular reading.

BRIEF DESCRIPTION OF THE DRAWINGS

The present angular position transducer apparatus is shown in a preferred embodiment in the accompanying drawings, wherein.

DESCRIPTION OF THE EMBODIMENT

Figure 1:
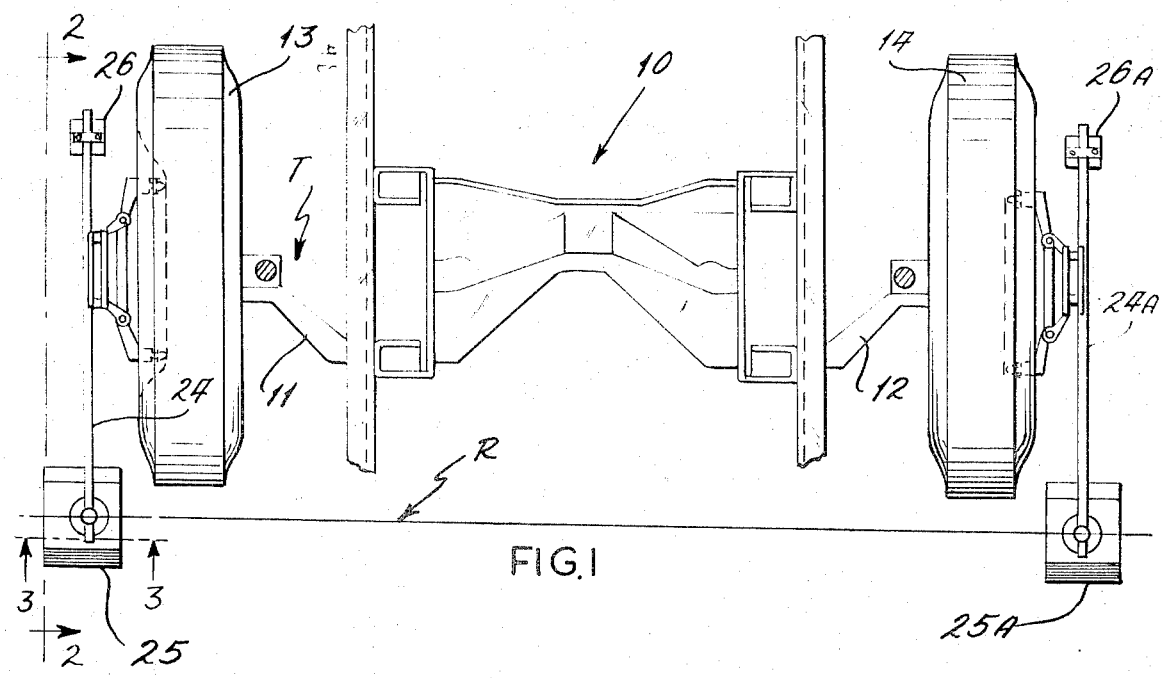
FIG. 1 is a schematic and fragmentary plan view of a portion of a vehicle having steerable wheels on which the present apparatus is mounted for the purpose of determining the toe angles of the wheels.

In the drawings, FIG. 1 is a schematic plan view of the steerable wheels and associated frame of a vehicle in which the frame portion 10 provides connecting arms 11 and 12 which establish a pivot for the wheels 13 and 14. The apparatus of this improvement is operatively mounted adjacent the outer face of each wheel in the manner shown in FIG. 2 so that the apparatus is disposed in a position that is parallel to the plane of wheel rotation.

Figure 2:
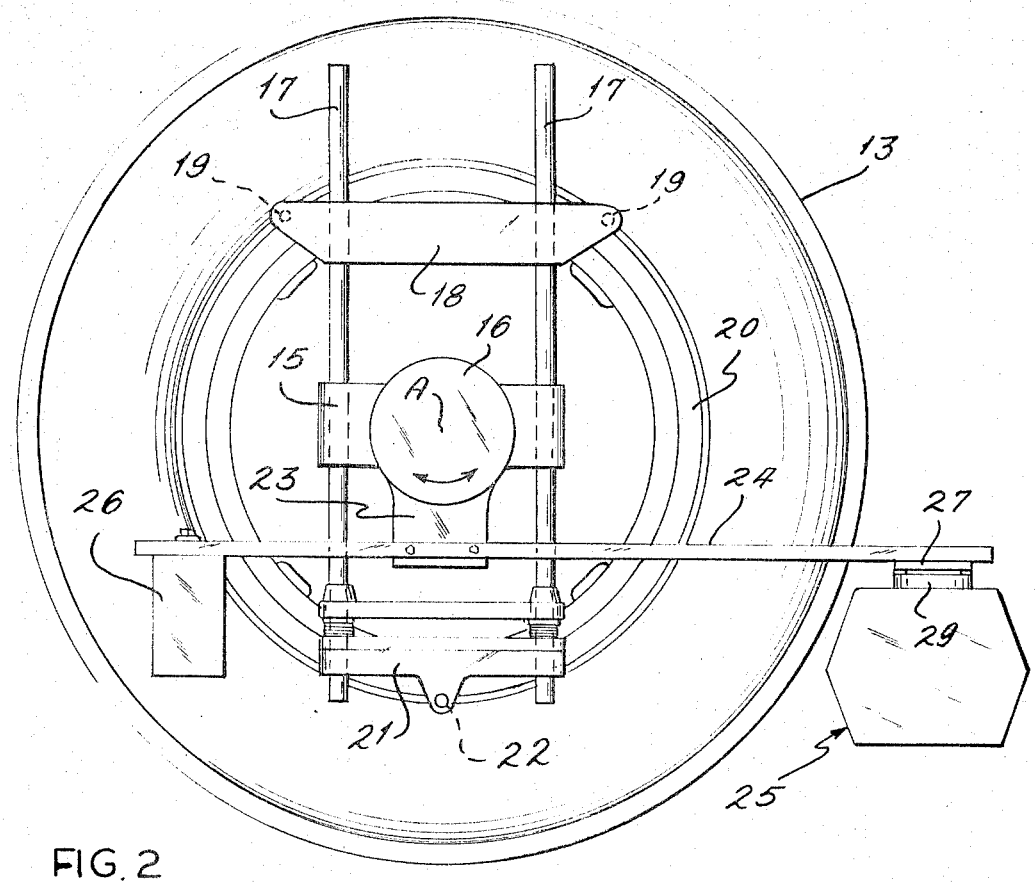
FIG. 2 is an elevational view looking along line 2—2 at the outer face of the right hand wheel of FIG. 1 to illustrate the mounting of an angular measuring unit, the mounting of the opposite unit being carried out in a similar manner.

In FIG. 2 the right hand vehicle wheel 13 supports an adapter which includes a principal slide 15 carrying a bracket 16 which is free to swing about the pivot axis A. The slide 15 is engaged on a pair of rods 17 which, in turn, engage in a cross member 18 to which are attached spaced hardened elements 19 adapted to grip the flange of the wheel rim 20. Below the slide 15 is an adjustable cross member 21 carrying a third hardened element 22 which also grips the rim flange. The member 21 is adjustable to suit the rim flange diameter, and the slide 15 is movable along the rods 17 so its pivot axis A may be aligned with the wheel spindle axis. Slide 15 is formed with an arm 23 to support a bar 24 which carries the present alignment apparatus to be described presently, but which in this view includes one unit 25 of a pair of cooperating units of the angular position transducer apparatus. The bar 24 is required to be in a horizontal position when the unit 25 is used for measuring wheel toe, and for this purpose a suitable weight 26 is attached to the arm 24 opposite unit 25. The arm 24 is sufficiently elongated to locate the unit 25 beyond the periphery of the wheel 13. The opposite cooperating unit 25A is similarly mounted on the left hand wheel 14 so that each unit 25 and 25A is in a position to be viewed by the other, as will appear.

Figure 3:
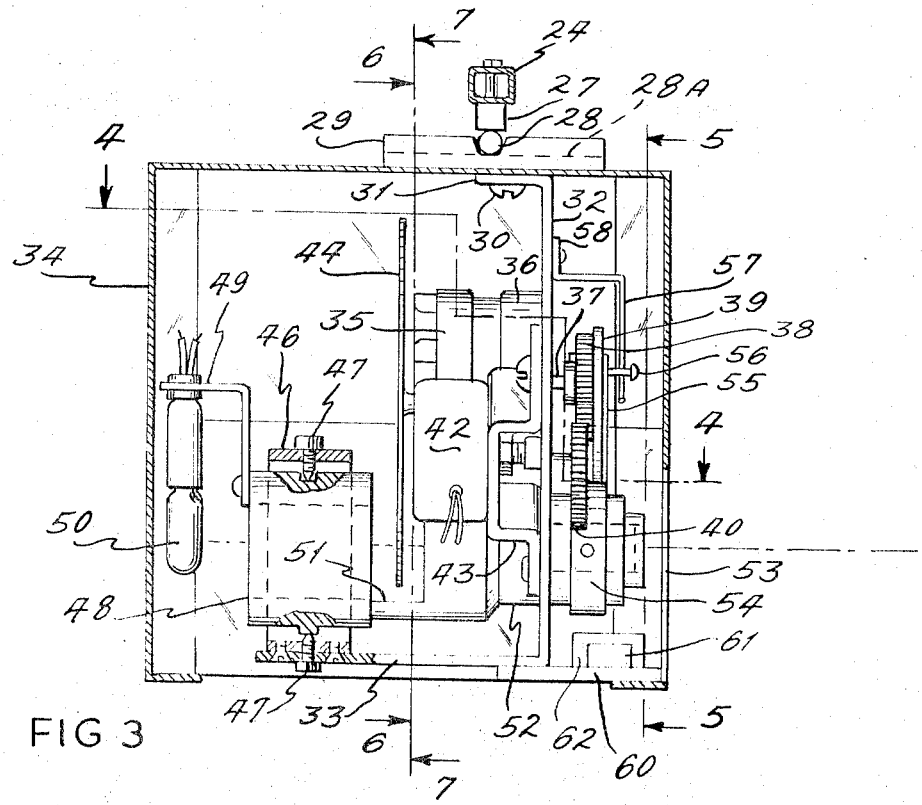
FIG. 3 is a sectional elevational view taken along line 3—3 in FIG. 1 of the right hand unit.

FIGS. 3 to 7 of the drawings illustrate the details of the right hand unit 25, and the following description thereof will be understood to apply to the left hand unit 25A. In FIG. 3 the arm 24 is a hollow box section and it supports an alignment element 27 which engages in a slot 28 of a turn block 29. The slot 28 is formed perpendicular to a second slot 28A, whereby the block 29 may be turned to one of two right angular positions, as the one shown in FIG. 3 and a position 90 degrees thereto.

The turn block 29 is attached by machine screws 30 to a flange 31 on the upper part of a frame piece 32, and the frame has an enlarged lower flange 33. A part 34 of a housing has its top wall fixed between the frame flange 31 and the turn block 29, and opposite depending walls extend to bottom inturned flanges. The frame 32 supports a synchronous motor 35 which has a suitable gear housing 36 from which a drive shaft 37 extends through the frame 32 for reception of a pinion gear 38 and a cam 39 on this same shaft. The gear 38 meshes with a second gear 40 on a shaft which is mounted on the frame to extend through and connect with the shaft of a rotor in a potentiometer 42. The potentiometer is enclosed in a suitable case which is supported by bracket 43 attached to the frame 32. The main shaft of the motor 35 supports a light chopper disc 44 (See FIG. 7) which rotates at the speed of the motor.

Figure 4:
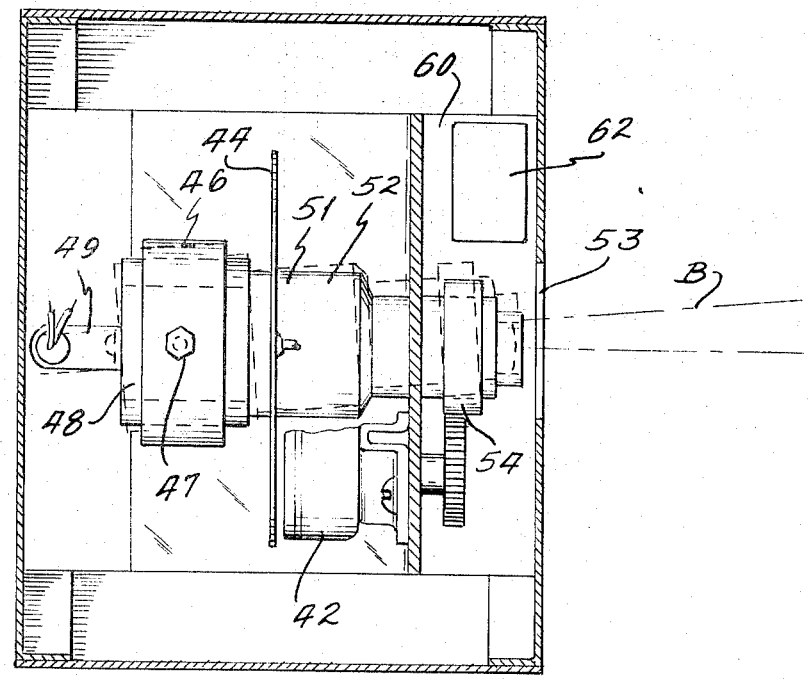
FIG. 4 is a sectional view taken at line 4—4 in FIG. 3.
Figure 7:
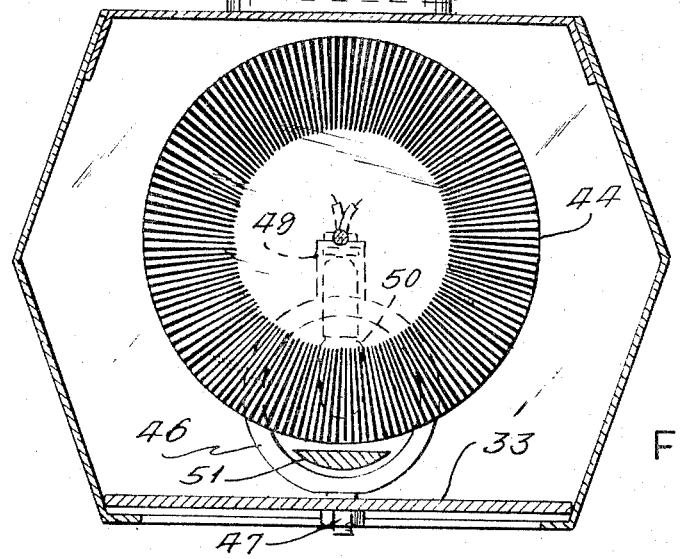
FIG.7 is another sectional elevational view taken along line 7—7 in FIG. 3 opposite to the view of FIG. 6.

In FIGS. 3, 4 and 7 there can be seen a light beam projector consisting of a pivot ring member 46 secured at its bottom to the flange 33 of the frame in position to support vertically aligned pivot elements 47. The projector is formed with a body 48 which houses an apertured element (not shown) for defining a light source of infinite size. The body 48 carries a suitable bracket 49 for a light bulb 50 supported in axial alignment with the horizontal axis of the body 48 and the light beam aperture. The body 48 is cut away at transverse slot 51 to allow the peripheral portion of the light chopper disc to pass in front of the beam of light formed in the body 48. The body 48 extends beyond the chopper disc slot 51 in the form of a lens barrel 52 which houses a suitable lens assembly for projecting a narrow beam B (FIG. 4) through the aperture 53 in one depending wall of housing 34. The outer end of the lens barrel 52 (FIG. 5) carries a ring bracket 54 having an arm 55 thereon directed upwardly to a position to be engaged by the contoured periphery of the cam 39. The arm 55 is resiliently held on the cam periphery by the cooperation of a pin 56 (FIG. 3) on the arm and a spring 57 engaged on the pin. The spring 57 is carried at its base 58 on the frame 32.

Figure 5:
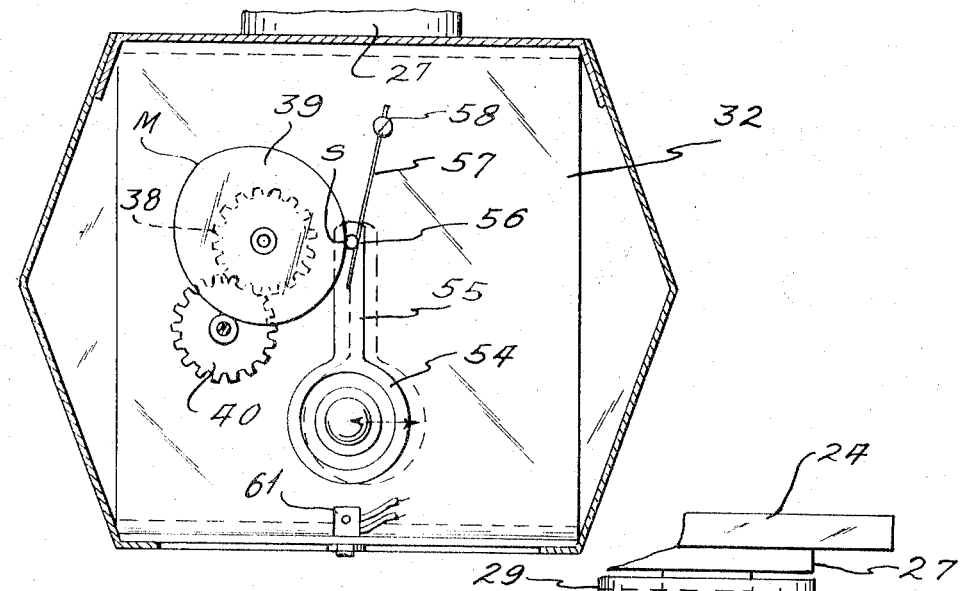
FIG. 5 is an elevational view in section taken along line 5—5 in FIG. 3.
Figure 6:
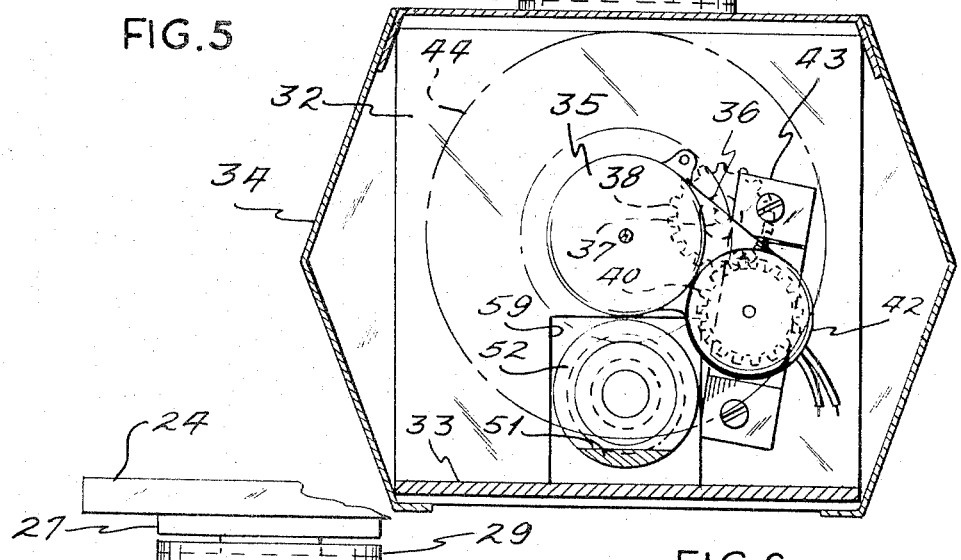
FIG. 6 is an elevational view in section taken along line 6—6 in FIG. 3 and opposite to the view of FIG. 5.

In view of the manner of mounting the light projector body 48, the lens barrel 52 extends through a suitable opening 59 (FIG. 6) in the frame 32. The opening 59 is large enough to allow the projector body 48 and barrel 52 to swing in a horizontal plane about the vertical axis defined by the pivots 47 (FIG. 3). The swinging movement is controlled by the cooperation of the cam 39 and the spring 57. As seen in FIG. 5, the spring 57 has pressed the pin 56 on arm 55 so the arm rides on the cam 39 at the point of minimum radius. The cam in this view rotates counter clockwise and in so doing moves the arm 55 to the right due to the linear increase in the cam profile until the point M is reached at 240° of rotation. Thereafter, the cam profile decreases through the final 120° of rotation. Thus, the cam profile for two-thirds of its arc swings the lens barrel 52 in one direction so the light beam B sweeps a path which is selected to include all of the angles of wheel toe expected to be found. The final one-third of the cam arc allows the lens barrel 52 to return to its starting point S. While the light beam B is caused to sweep through a search angle from S to M and return to S, the potentiometer is rotated simultaneously and at a one-to-one ratio so the swing of the beam B is coordinated with the potentiometer response.

The unit of FIG. 3 is provided with a support shelf 60 for a photocell element 61 which is located adjacent the housing opening 53 and directly below the outer end of the lens barrel 52. The shelf 60 also supports a box 62 which contains the amplifier circuit components for the photocell.

Figure 8:
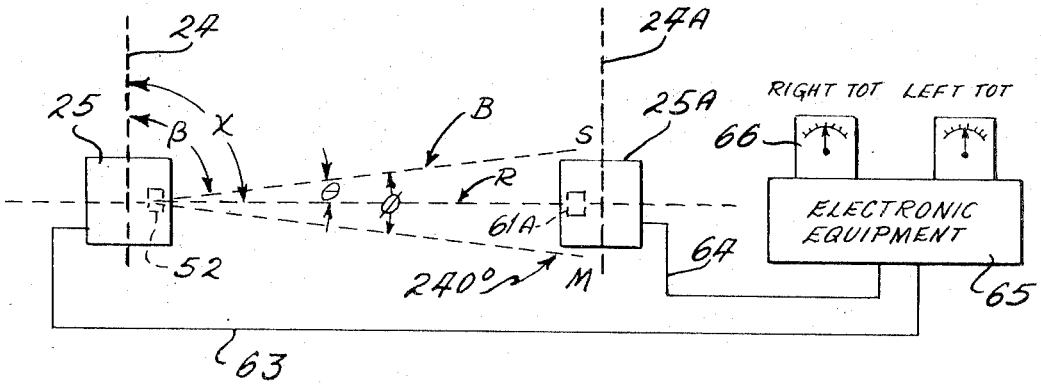
FIG. 8 is a diagrammatic view of the cooperating units for the vehicle wheels of FIG. 1 and the associated electronic equipment connected thereto, the view illustrating the cooperative action of the light beam transmitter on the right hand wheel and the beam detector of the opposite wheel.

Turning now to FIG. 8 the units 25 and 25A are respectively connected by leads 63 and 64 to a console housing 65 where the electronic equipment (later to be described) is conveniently housed, except for the respective boxes 62 which contain the light beam detector amplifiers. The console 65 supports the visual display meters 66 and 66A in position for viewing.

As shown in FIG. 8 the units 25 and 25A are positioned in spaced relation on the reference axis R (also shown in FIG. 1) such that the detector photocell 61A in the left wheel unit 25A is in position to receive the light beam projected from the opposite unit 25. The light beam projector 52 (FIG. 3) is swept through an angle $\phi$ (Phi) from time zero angular position to an angular position of 240° of cam rotation displaced from the zero angular position. At the zero cam rotation position of the light beam, the beam forms the angle $\beta$ (Beta) with the arm 24. As the beam sweeps toward its 240 degree cam position it strikes the detector 61A in unit 25A at time $T_1$ and the angle X it forms with arm 24 at this time $T_1$ is the angle to be determined. It is preferred that the beam should sweep through the first 240° of cam rotation at substantially one-half the speed of its return to the time zero position. This motion is achieved by a cam 39 (FIG. 5) which constantly rotates through 360° and produces linear angular motion of the light beam as it rotates. The cam 39 causes the beam to sweep back and forth for each revolution, with the primary sweep covering 240° of cam rotation and the return sweep covering 120° of cam rotation. The same but opposite action is produced for the light beam projected from unit 25A toward unit 25. Thus, as each light beam sweeps past the detector of the opposite unit at time $T_1$ it produces a signal which is proportional to the angle X formed with the arm 24 or 24A, and each signal is amplified at the amplifiers 62 and 62A and transmitted through leads 63 and 64 to the console 65 for analysis and visual display.

Figure 9:
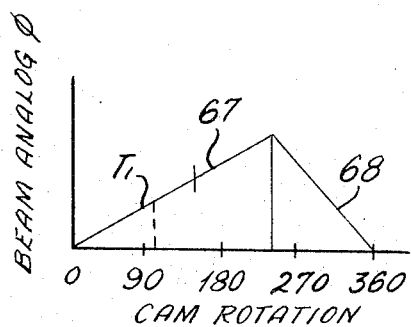
FIG. 9 is a graph showing the angle of light beam sweep in relation to cam rotation causing the sweep of the beam.
Figure 9A:
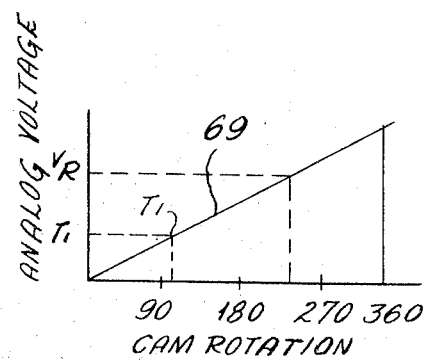
FIG. 9A is a graph related to the graph of FIG. 9 wherein an analog voltage signal is related to the cam rotation which effects the light beam angular sweep.

The analysis of the signal from a detector is initiated in the manner graphically shown in FIGS. 9 and 9A. In FIG. 9 the beam angle $\phi$ (Phi) sweeps through an angle proportional to 240° of cam rotation, and the beam describes a linear motion along the curve 67 as it travels in its primary sweeps. The return sweep follows the curve 68 back to its zero position. This motion of the beam is repeated many times for the purpose of continually up-dating the signal captured in the electronic equipment of console 65. Concurrently with the beam sweep motion, the motor 35 (FIG. 6) is connected by gears 38 and 40 in a one-to-one ratio to the potentiometer 42 for rotating the brush arm therein. FIG. 9A graphically shows the linear analog signal voltage in relation to rotation of the cam 39 (FIG. 3). The signal voltage follows the linear curve 69, however when the voltage exceeds the reference voltage value $V_R$ the beam is in its return sweep. This voltage condition is sensed and used to prevent up-dating of the captured signal during the return sweep.

Therefore, FIG. 9 shows light beam angular orientation with respect to cam rotation. The beam orientation angle $\phi$ (Phi) can be scaled on the meter to any value so as to include all angles to be investigated by choosing the proper cam arrangement. Also, in FIG. 9A there is illustrated the operating drive by the cam 39 of the potentiometer which produces an electrical signal voltage at its brush, the signal voltage being linear with respect to cam rotation. In this manner cam rotation between 0° and 240° produces a potentiometer signal voltage which is the analog of the beam angle orientation.

It will now appear from the foregoing description that to form a reference axis R from which to make angular measurements, a suitable light beam detector, such as a photocell 61, is positioned at the axis R so as to be contacted by a light beam B as it sweeps back and forth. At the precise moment in time the detector is contacted by the light beam B, the potentiometer 42 signal voltage is fed to and held in a memory device 70. That voltage now held in the device 70 is an analog of the light beam angular orientation when it passes through the reference axis R and contacts the detector 61, and that voltage represents the beam angle $\phi$ (Phi). The angle X which is the orientation of the whole unit with respect to the reference axis R is made up of the angle B (Beta), which is a constant angle established by the physical arrangement of the unit, and the measured angle $\theta$ (Theta). Therefore, by proper ranging circuits 71 and zeroing circuits 72 of the voltage held in the memory device 70, that voltage can be presented on a voltage sensitive read-out meter 66 (or 66A) as the actual angular orientation of the unit 25 (or 25A) with respect to the reference axis R. Since the unit has been solidly affixed to the wheel being studied, the angular orientation is likewise known and can be displayed.

THE METHOD OF THE EMBODIMENT

The light beam B projected from a unit (25 or 25A) is not a steady stream of light as it is chopped or interrupted at a frequency of substantially 1,000 cycles per second by teh chopper disc 44 (FIG. 7). The detector system (61 or 61A) is sensitive to light chopped at this frequency and tends to reject all other frequencies. This aids in eliminating the interferences from external light sources and variations in ambient light.

Figure 10:
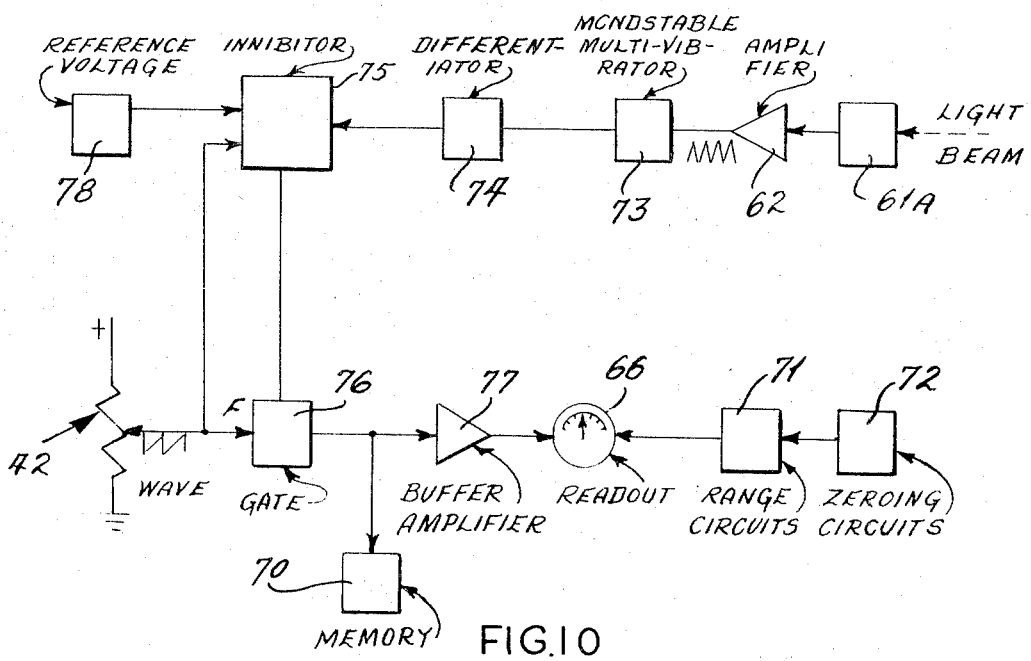
FIG. 10 is a simplified diagram of the electronic elements associated with the right wheel unit seen in FIG. 1 whereby the light beam detected thereat triggers the required response for producing a read-out of the desired angle, the diagram being understood to show the electronic elements associated with the opposite unit on the left wheel. The electronic elements of this view are conveniently housed in a console remote from the vehicle as indicated in FIG. 8.

When the light beam B contacts the oppositely located detector there is a discrete period of time during which this contact lasts. This is due to the finite width of the beam. During that time period the detector sees a burst of 1,000 cycle per second chopped light and generates pulses which are sent along to its amplifier 62 (FIG. 10). The amplifier 62 sends the same signal along only much larger to a monostable multi-vibrator device 73. The leading edge of the light burst signal triggers the device 73 which produces a negative going pulse to differentiator device 74. The negative going pulse remains fixed for a period of time somewhat in excess of the period during which the light burst is received. The differentiator device 74 produces a very narrow pulse coincident with the leading edge of the signal at the monostable multi-vibrator device 73 and differentiator device 74.

If the light beam is traversing in its primary sweep, an inhibitor device 75 will allow a narrow gate pulse of known duration to operate the gate 76 by closing a switch therein during that time period. This pulse is coincident also with the leading edge of the signal at the devices 75, 74, 73 and 62. The pulse has a known time duration and, therefore, the voltage generated by the potentiometer 42 sent along in the circuit to the memory device 70 will be that voltage value at the same time. This signal conditioning is necessary to insure the accuracy of the end of the reading time $T_1$ with respect to the angular position of the light beam $\beta$ (FIG. 8). It always occurs with the same small delay after the initial contact of the light beam with the detector during the primary beam sweep. The voltage now retained in the memory device 70 will remain unchanged until the next gate pulse occurs during the next primary sweep cycle of the light beam, when the process of the circuit devices will be repeated.

The circuit of FIG. 10 contains a buffer amplifier 77 which provides the power to drive the read-out meter (66 or 66A) while isolating and protecting the voltage stored in the memory device 70. The ranging circuit 71 and zeroing circuit 72 provide proper scaling so that the read-out display can be in a convenient form.

As noted above in FIGS. 8, 9 and 9A, for cam rotation from 240° through 360° the light beam is in its return sweep and will obviously contact the detector to cause a gate pulse to be developed. However, due to the finite width of the light beam B and the opposite angular direction of the sweep, an error in the gate pulse timing would be produced. This erroneous pulse is therefore prevented from triggering the gate circuit by the inhibitor device 75.

It can be understood from the graph of FIG. 9 that for rotation of the cam 39 between 240° and 360° the voltage of the potentiometer 42 is more than some voltage $V_R$ produced by the reference voltage source 78. This reference voltage is predetermined and supplied constantly to the inhibitor device 75 (FIG. 10). The inhibitor device 75 compares the voltage present at the reference 78 with the incoming voltage from the potentiometer 42. As long as the potentiometer voltage is greater than the reference voltage $V_R$ (FIG. 9A), any gate pulse which is initiated will not be allowed to trigger the gate device 76. This prevents an erroneous signal from entering the memory device 70 during the return sweep of the light beam.

It should now be clear that the foregoing apparatus is useful for measuring any angular relationship between a movable body and a fixed reference plane or axis, wherein the measuring is achieved by an angular position transducer. The transducer is well adapted as herein set forth to an improved method of measuring angular relationships, particularly where the angles are small so that these small angles can be expanded for easier examination.

What is claimed is:

1. Angular position transducer apparatus for determining the angular position of a body relative to a predetermined reference line, said apparatus comprising a light projector oriented relative to said body to normally direct its beam of light along the reference line and thereby have a known angular relation to the body, light beam sensing means spaced from said projector and lying on the reference line, means to swing the projector independently of the body and to either side of said reference line, said light beam sensing means generating a signal response on receiving the beam, signal voltage generating means operable concurrently with said projector swing means to generate a signal voltage proportional to the angular position of said light beam with respect to its known angular relation, said voltage generating means and light beam sensing means are connected into a circuit which includes gate means connected to said sensing means to respond to the light beam, circuit means to feed signal voltage to said gate means, said circuit means includes means to differentiate the direction of sweep of said light projector and inhibit the operation of said gate means for one direction of sweep, memory circuit means receiving the signal voltage admitted through said gate means by said sensing means, said memory circuit means being connected into said voltage display means and means connected to the voltage generating means to display the voltage in terms of angular units.

2. The apparatus set forth in claim 1 wherein said light projector and voltage generating means have a common drive which effects angular sweep of said projector and signal voltage generating operation proportional to the sweep angles.

3. Transducer apparatus for finding the angular deviation of a body relative to a predetermined reference axis, said apparatus including a light beam projector carried on the body adjacent the reference axis, a light beam detector spaced from the body and being on the reference axis in position to receive the light beam projected along the reference axis, means operable to swing said projector relative to the body such that the light beam sweeps through an angle to either side of the reference axis and which sweep angle includes the expected angle of deviation of said body relative to the reference axis, voltage generating means in the apparatus operable to produce a signal voltage proportional to the angular sweep of said light beam, electrical gate means connected to said voltage generating means, circuit means connecting said light beam detector to said gate means, said circuit means electrically relating said light beam detector and voltage generating means for only one direction of sweep of said light beam projector, said detector generating an electrical impulse in response to receipt of the light beam at the angle of said body to the reference axis, said detector impulse opening said gate means to pass the signal voltage at its value at the time of receipt by the detector of the light beam, and electrical meter means connected to said gate to display the signal voltage at the time of gate opening, said meter means translating the signal voltage in terms of the angular relation of the body to the reference axis.

4. A method of determining an angular relation of the plane of rotation of a rotary body to a reference axis which includes relating a light beam projector with the plane of body rotation, projecting the light beam along the reference axis from the body and sweeping the beam angularly back and forth across the reference axis and in a plane containing the reference axis, carrying the light beam sweep through an angle which includes the angular relation to be determined of the plane of rotation of the body to the reference axis, receiving said projected light beam and generating a signal initiated by said light beam which causes the sampling of a generated signal which has a characteristic that is proportional to the angular position of the plane of rotation of the body relative to the projected light beam, and converting said generated signal sampling into an angular reading relative to the reference axis.

5. A method for finding the angular position of the plane of rotation of a body relative to a reference axis, said method including sweeping a light beam back and forth across the reference axis and through an angle which includes the angular relation of the plane of rotation of the body to the reference axis, generating a voltage concurrently with light beam sweep which changes in timed relation to the light beam sweep in one direction through its angular sweep, detecting the light beam at the angular position of the plane of rotation of the body relative to the reference axis, generating a signal upon detecting the light beam, applying the signal generated at the time of light beam detection to finding the value of the generated voltage at that time, and translating the voltage at the time of detection into an angular reading of the body plane of rotation relative to the reference axis.

6. A method for displaying electrically the angular position of the plane of rotation of a body relative to a reference axis which method consists in establishing a reference axis; disposing a light beam projector in a predetermined position in the body plane of rotation; moving the light beam back and forth to both sides of the reference axis and through an angle which includes the angular position of the plane of rotation to be displayed; constantly generating a signal voltage which is the analogue of the angular relation of the light beam to the reference axis; detecting the time of coincidence of the light beam with the reference axis; collecting the generated signal voltage at the time the light beam sweeps into coincidence with the reference axis and in only one direction of sweep; sampling the signal voltage at the time of detection of the coincidence of the light beam with the reference axis; and displaying the generated voltage as an angular reading of the plane of rotation of the body relative to the reference axis.

7. A method for displaying the angular position of the plane of rotation of a rotary body relative to a reference axis which method consists in aligning the reference plane of the body at some angle to be determined relative to the reference axis, projecting a light beam from a position in the reference plane of the body along the reference axis, locating a signal generating light responsive detector on the reference axis and at a position spaced from light beam projector in the reference plane of the body, moving the projected light beam back and forth across the reference axis and through an angular amount which includes the angle to be determined, generating a signal concurrently with movement of said projected light beam but having a characteristic that is proportional to the angular relation of the body plane relative to the projected light beam at the coincidence of the light beam and reference axis, and converting the generated signal and the detector signal into a reading of the angle of the body plane to be determined relative to the reference axis.

* * * * *